US012770935B2

(12) United States Patent
Li et al.

(10) Patent No.: US 12,770,935 B2
(45) Date of Patent: Oct. 20, 2026

(54) TRACTION BATTERY CONTROLLER USING ACTIVE CHARGE CONTROL TO DETECT BATTERY CAPACITY

(71) Applicant: Ford Global Technologies, LLC, Dearborn, MI (US)

(72) Inventors: Yonghua Li, Ann Arbor, MI (US); Richard Dyche Anderson, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 785 days.

(21) Appl. No.: 17/987,945

(22) Filed: Nov. 16, 2022

(65) Prior Publication Data

US 2024/0162508 A1 May 16, 2024

(51) Int. Cl.
*H01M 10/42* (2006.01)
*H01M 10/44* (2006.01)
*H02J 7/90* (2026.01)

(52) U.S. Cl.
CPC ..... *H01M 10/4285* (2013.01); *H01M 10/446* (2013.01); *H01M 2010/4278* (2013.01); *H01M 2220/20* (2013.01); *H02J 7/90* (2026.01)

(58) Field of Classification Search
CPC ........... H01M 10/4285; H01M 10/446; H01M 2010/4278; H01M 2220/20; H02J 7/007
See application file for complete search history.

(56) References Cited

U.S. PATENT DOCUMENTS 8,560,257 B2 10/2013 Tang et al.
8,751,086 B2 6/2014 Li et al.
9,187,007 B2 11/2015 Li et al.
9,539,912 B2 1/2017 Li
9,869,725 B2 * 1/2018 Chaturvedi .......... G01R 31/388
10,322,634 B2 6/2019 Wang et al.
10,393,813 B2 8/2019 Sun et al.
10,436,848 B2 10/2019 Li et al.
11,498,446 B2 11/2022 Gibeau et al.
11,541,775 B2 1/2023 Yao et al.
2015/0352972 A1 * 12/2015 Li ........................... B60L 58/12 429/62
2017/0106760 A1 * 4/2017 Wang ...................... B60L 58/12
2017/0176540 A1 * 6/2017 Omi ....................... H01M 10/48
2021/0206291 A1 * 7/2021 Gibeau ................... B60L 53/66
2021/0237614 A1 * 8/2021 Yao .......................... G06N 3/08
2022/0006313 A1 * 1/2022 Lim .................... H01M 10/486
2024/0079892 A1 * 3/2024 Lee ...................... G01R 31/388
2025/0076386 A1 3/2025 Dylla

FOREIGN PATENT DOCUMENTS

KR 102414493 B1 7/2022

* cited by examiner

*Primary Examiner* — Julian D Huffman
*Assistant Examiner* — John P Ondrasik
(74) *Attorney, Agent, or Firm* — David B. Kelley; Brooks Kushman P.C.

(57) ABSTRACT

A method for detecting a capacity of a battery, such as a traction battery of an electrified vehicle, includes varying a charge current provided to the battery and measuring a terminal voltage of the battery as the charge current is being varied. An estimator, that utilizes voltage feedback based on a model of the battery to provide state and parameter estimations of the battery, is driven with the terminal voltage to estimate a state-of-charge (SOC) of the battery. The capacity of the battery may be detected based in part on the SOC.

7 Claims, 9 Drawing Sheets

TRACTION BATTERY CONTROLLER USING ACTIVE CHARGE CONTROL TO DETECT BATTERY CAPACITY

TECHNICAL FIELD

The present invention relates to detecting the capacity of a traction battery of an electrified vehicle.

BACKGROUND

An electrified vehicle includes a traction battery for providing power to a motor of the vehicle to propel the vehicle. The capacity of the traction battery may be monitored in controlling the operation of the vehicle and/or the traction battery.

SUMMARY

A method for detecting a capacity of a battery, such as a traction battery of an electrified vehicle, includes varying a charge current provided to the battery and measuring a first terminal voltage of the battery as the charge current is being varied. An estimator, that utilizes voltage feedback based on a model of the battery to provide state and parameter estimations of the battery, is driven with the first terminal voltage to estimate a first state-of- charge (SOC) of the battery. The capacity of the battery may be detected based in part on the first SOC.

The method may further include measuring a second terminal voltage of the battery while the charge current is not being provided to the battery and the battery is in a steady state and detecting a second SOC of the battery based on the second terminal voltage.

In this case, the capacity of the battery may be detected based in part on the first SOC and the second SOC.

The method may further include detecting an amount of current discharged from the battery between a first time that the battery has the second SOC and a subsequent second time that the battery has the first SOC. In this case, the capacity of the battery may be detected based on the first SOC, the second SOC, and the amount of current.

The method may further include detecting an amount of current charged to the battery between a first time that the battery has the first SOC and a subsequent second time that the battery has the second SOC. In this case, the capacity of the battery may be detected based on the first SOC, the second SOC, and the amount of current.

The estimator may be driven with the first terminal voltage to estimate a parameter of the battery.

The estimator may be an extended Kalman filter (EKF).

The charge current may be varied according to a predetermined charge profile consistent with battery charge capability and/or persistent excitation of the battery.

A method for use with an electrified vehicle having a traction battery is provided. The method includes, at a given time while the traction battery is in a steady state, detecting a first SOC of the traction battery based on a first terminal voltage of the traction battery at the given time. The method further includes, while the traction battery is being charged with a charge current, varying the charge current, measuring a second terminal voltage of the traction battery as the charge current is being varied, and driving an estimator, that utilizes voltage feedback based on a model of the traction battery to provide state and parameter estimations of the traction battery, with the second terminal voltage to estimate a second SOC of the traction battery. A capacity of the traction battery is detected based in part on the first SOC and the second SOC.

A system having a first controller and a second controller is provided. The first controller is configured to cause a charger to vary a charge current provided by the charger to a traction battery of an electrified vehicle. The second controller is configured to measure a first terminal voltage of the traction battery as the charge current is being varied and to drive an estimator, that utilizes voltage feedback based on a model of the traction battery to provide state and parameter estimations of the traction battery, with the first terminal voltage to estimate a first state-of-charge (SOC) of the traction battery. The second controller is further configured to detect a capacity of the traction battery based in part on the first SOC.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
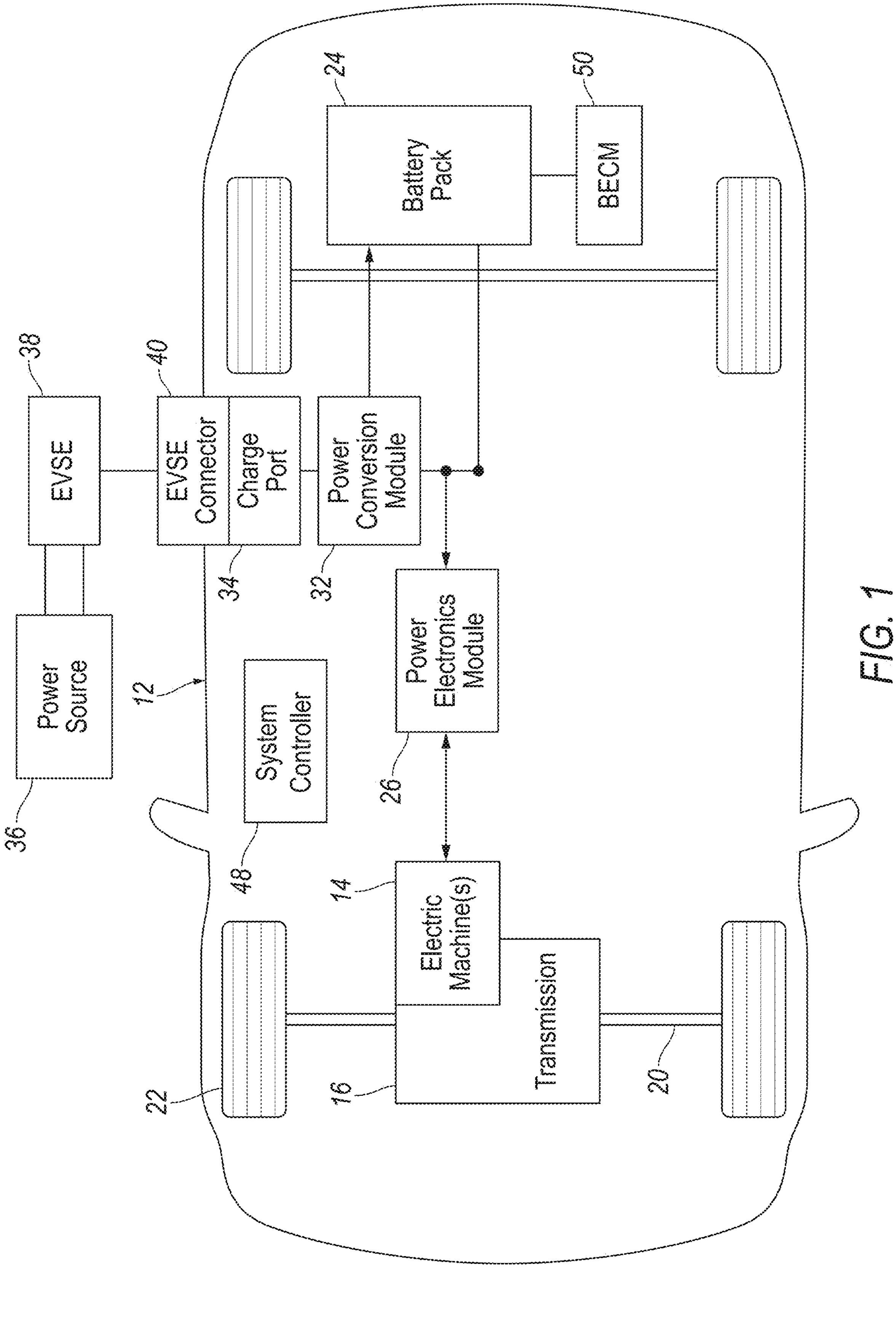
FIG. 1 illustrates a block diagram of a battery electric vehicle (BEV) having a traction battery.

Referring now to FIG. 1, a block diagram of an electrified vehicle 12 in the form of a battery electric vehicle (BEV) is shown. BEV 12 includes a powertrain having one or more traction motors ("electric machine(s)") 14, a traction battery ("battery" or "battery pack") 24, and a power electronics module 26 (e.g., an inverter). In the BEV configuration, traction battery 24 provides all of the propulsion power and the vehicle does not have an engine. In other embodiments, the vehicle may be a plug-in hybrid electric vehicle (PHEV) further having an engine.

Traction motor 14 is part of the powertrain of BEV 12 for powering movement of the BEV. In this regard, traction motor 14 is mechanically connected to a transmission 16 of BEV 12. Transmission 16 is mechanically connected to a drive shaft 20 that is mechanically connected to wheels 22 of BEV 12. Traction motor 14 can provide propulsion capability to BEV 12 and is capable of operating as a generator. Traction motor 14 acting as a generator can recover energy that may normally be lost as heat in a friction braking system of BEV 12.

Traction battery 24 stores electrical energy that can be used by traction motor 14 for propelling BEV 12. Traction battery 24 typically provides a high-voltage (HV) direct current (DC) output. Traction battery 24 may be a lithium-ion battery. Traction battery 24 is electrically connected to power electronics module 26. Traction motor 14 is also electrically connected to power electronics module 26. Power electronics module 26, such as an inverter, provides the ability to bi-directionally transfer energy between traction battery 24 and traction motor 14. For example, traction battery 24 may provide a DC voltage while traction motor 14 may require a three-phase alternating current (AC) current to function. Inverter 26 may convert the DC voltage to a three-phase AC current to operate traction motor 14. In a regenerative mode, inverter 26 may convert three-phase AC current from traction motor 14 acting as a generator to DC voltage compatible with traction battery 24.

Traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and BEV 12. External power source 36 may provide DC or AC electric power to EVSE 38. EVSE 38 may have a charge connector 40 for plugging into a charge port 34 of BEV 12.

A power conversion module 32 of BEV 12, such as an on-board charger having a DC/DC converter, may condition power supplied from EVSE 38 to provide the proper voltage and current levels to traction battery 24. Power conversion module 32 may interface with EVSE 38 to coordinate the delivery of power to traction battery 24.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating BEV 12. In embodiments, controller 48 is a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Controller 48 implements a battery energy control module (BECM) 50. BECM 50 is in communication with traction battery 24. BECM 50 is a traction battery controller operable for managing the charging and discharging of traction battery 24.

Figure 2:
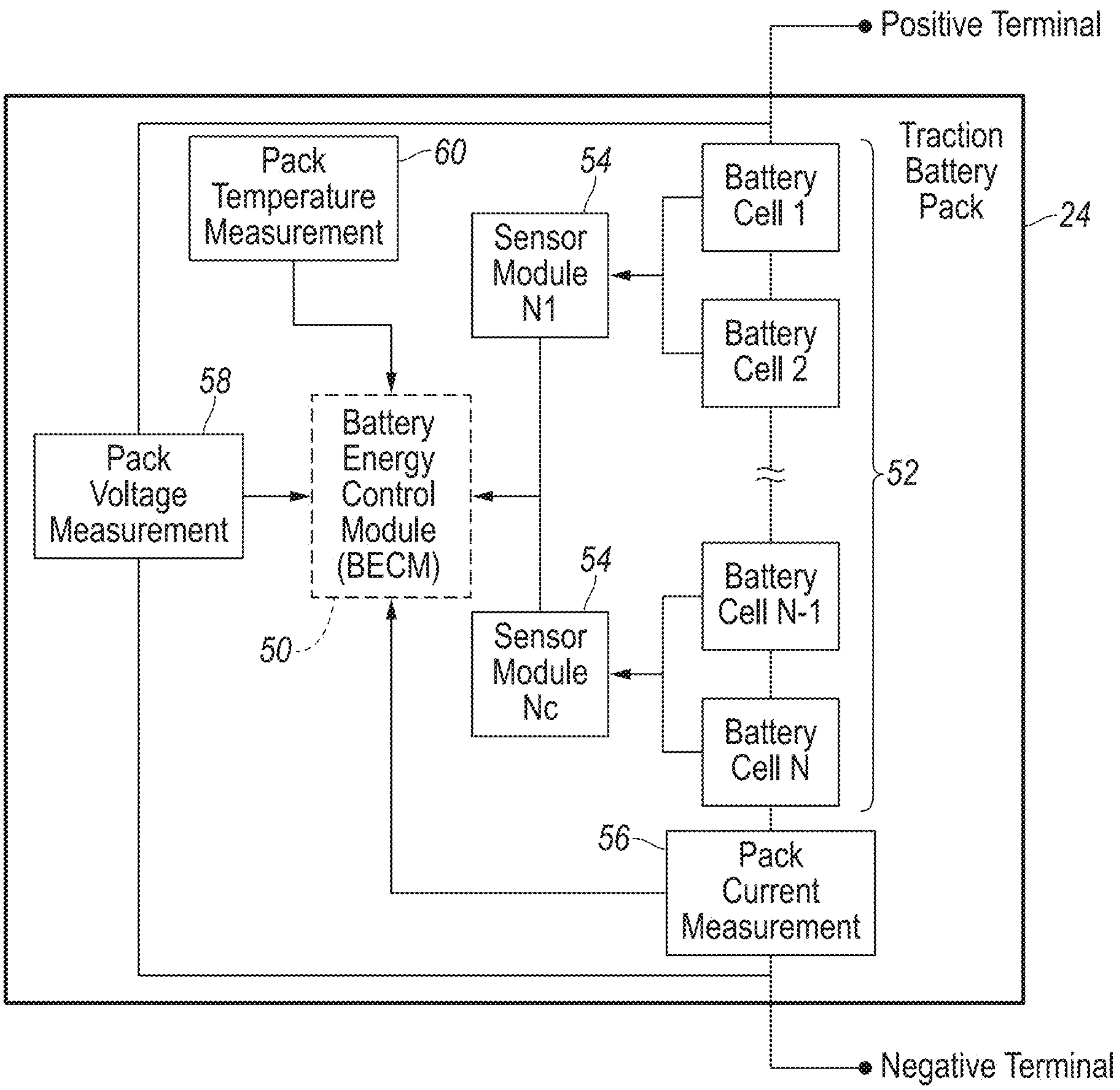
FIG. 2 illustrates a block diagram of an arrangement for a fraction battery controller to monitor and control the fraction battery.

Referring now to FIG. 2, with continual reference to FIG. 1, a block diagram of an arrangement for BECM 50 to monitor and control traction battery 24 is shown. Traction battery 24 is comprised of a plurality of battery cells 52. Battery cells 52 are physically connected together (e.g., connected in series as shown in FIG. 2).

BECM 50 is operable to monitor pack level characteristics of traction battery 24 such as traction battery current 56, traction battery voltage 58, and traction battery temperature 60. BECM 50 is also operable to measure and monitor battery cell level characteristics of battery cells 52 of traction battery 24. For example, terminal voltage, current, and temperature of one or more of battery cells 52 may be measured. BECM 50 may use a battery sensor 54 to measure the battery cell level characteristics. Battery sensor 54 may measure the characteristics of one or multiple battery cells 52. BECM 50 may utilize Nc battery sensors 54 to measure the characteristics of all battery cells 52. Each battery sensor 54 may transfer the measurements to BECM 50 for further processing and coordination. Battery sensor 54 functionality may be incorporated internally to BECM 50.

BECM 50 controls the operation and performance of traction battery 24 based on the monitored traction battery and battery cell level characteristics. For instance, BECM 50 may use the monitored characteristics to detect the capacity of traction battery 24 for use in controlling the traction battery and/or BEV 12.

1.0 Introduction

A consideration of BECM 50 is to accurately detect the capacity of traction battery 24. There are two related requirements in battery capacity detection. First, the battery capacity detection has to be made frequent enough to keep up with the capacity change in the battery cells or the pack, either due to calendar aging or through usage (charging and discharging). Second, the battery capacity detection has to be accurate enough to meet vehicle control requirements as battery capacity is used in state-of-charge (SOC) and state-of-power (SOP) calculations of the traction battery, distance-to-empty (DTE) calculations of the electrified vehicle, battery cell diagnostics and prognostics, and other uses.

For instance, the SOC of traction battery 24, which is indicative of the level of charge stored in the traction battery relative to the capacity of the traction battery, is used for deriving the DTE of BEV 12. As such, an accurate DTE depends on an accurate detection of the capacity of traction battery 24.

In accordance with the present disclosure, BECM 50 is configured to detect the capacity of traction battery 24 frequently enough to keep up with capacity changes and accurately enough to meet control requirements of BEV 12. Conventional operation for detecting the capacity of traction battery 24 involves using an initial SOC measurement and a final SOC measurement, along with other factors taken while the traction battery is being used. The initial SOC and fmal SOC measurements are to be taken while the traction battery is "rested" (i.e., in a steady state). For instance, the initial SOC measurement is taken while the traction battery is rested prior to being charged or discharged, and the fmal SOC measurement is taken once the traction battery is rested after being charged or discharged. However, there is issue with measuring the final SOC as it takes a relatively long time for the fraction battery to become rested.

BECM 50 enhances the conventional operation by being able to estimate the final SOC without having to wait until fraction battery 24 is rested. Particularly, BECM 50 actively varies the charging current while fraction battery 24 is being charged so that the terminal voltage of the battery as measured can be used to drive an extended Kalman filter (EKF) to estimate the final SOC. BECM 50 then employs the estimated fmal SOC in the conventional operation for detecting the capacity of fraction battery 24 whereby a more frequent and more accurate measurement of the capacity of the fraction battery is achieved.

The active charging control carried out by BECM 50 to estimate the fmal SOC is motivated in part by the following considerations. Standard industry practice (including the DC Charging standard, SAE J2847/2, communication between plug-in electrified vehicles and off- board DC Chargers) calls for the electrified vehicle (i.e., BECM 50) to request a maximum charge current and voltage (and, optionally, a charge power). This gives BECM 50 complete control of the charge algorithm, up to the limits of the charge station. BECM 50 can therefore make small adjustments to the charge current without having a significant effect on the time it takes to charge fraction battery 24, which is what the vehicle user notices. This is especially true when the vehicle user leaves the electrified vehicle during charging, such as a "conventional" overnight charge.

The conventional operation detects the capacity of traction battery 24 by using the difference of two SOC values (i.e., the initial SOC and the final SOC measurements) of the traction battery obtained independent of the capacity of the fraction battery, divided by the current integration in between these two SOC values. This conventional operation detection process is described in U.S. Pat. No. 8,751,086. The SOC values are obtained through open circuit voltage (OCV) readings, which are measured when traction battery 24 is considered to have reached steady state (i.e., the traction battery is rested with both an electrical and thermal equilibrium reached).

Field study of traction battery capacity detection has shown that the update frequency is far from ideal (i.e., the update frequency is not catching up with the actual traction battery capacity loss), especially for those which use less depth of discharge (DOD) before the traction battery is re-charged. The reason is that the conventional capacity detection strategy, described in the aforementioned U.S. Pat. No. 8,751,086, normally discontinues the capacity estimation process when the electrified vehicle is plugged into a charger (since an ideal traction battery steady state cannot be achieved). The reason is that by plugging the electrified vehicle into a charger, the expectation of a rested traction battery cannot be achieved, rendering the (accurate) SOC value acquisition at electrified vehicle rest state impossible to obtain.

Hence, to increase both frequency and accuracy of traction battery capacity learning, BECM 50 utilizes the charge control property (that is the charge current is requested by the BECM and most likely granted by the charger within its capability) in conjunction with a model-based traction battery state estimator. By utilizing the charge control property in conjunction with the model-based traction battery state estimator, relatively much faster SOC estimation convergence can be expected, as compared with that of waiting for the traction battery cell/pack to reach steady state. Once such SOC estimation convergence is reached, combined with a starting OCV (SOC) during last drive cycle starting data (OCV or SOC—either through rested battery voltage measurement or through the techniques presented in the present disclosure) plus the current integration since then, BECM 50 obtains a traction battery capacity estimation, which otherwise cannot be obtained using conventional techniques. Further, the process employed by BECM 50 in accordance with the present disclosure can be used for both of the two OCVs required for traction battery capacity estimation. An added benefit is that the active charge control also helps with traction battery model parameter estimation.

2.0 Problem

As described above, the conventional operation for detecting the capacity of traction battery 24 involves using an initial SOC measurement taken while the traction battery is rested prior to being charged or discharged, and a final SOC measurement taken once the traction battery is rested after being charged or discharged, but there is issue with measuring the final SOC as it takes a relatively long time for the traction battery to become rested. This issue associated with capacity estimation for a traction battery comprising a series of battery cells will now be more fully explained.

The battery cell capacity is calculated using the following equation:

$$\text{Capacity} = \frac{\int \text{Current}}{SOC_i - SOC_f} \tag{1}$$

Equation (1) is to calculate the capacity based on current integration divided by the ΔSOC. (Note that discharge current is considered to be positive.) The two SOCs, namely an initial SOC ($SOC_i$) and a final SOC ($SOC_f$), should be obtained independently of the capacity value. For lithium-ion batteries, the SOC values can be obtained through the measurement of battery cell terminal voltage when the battery cells are considered "rested" (i.e., reached an electric-thermal equilibrium).

Uncertainties associated with equation (1) can be expressed as:

$$Q = \frac{\sum I\Delta t}{(SOC_i - SOC_f)} \pm \left(\frac{\sum I\Delta t}{(SOC_i - SOC_f)}\right)\sqrt{\left(\frac{U(\sum I\Delta t)}{\sum I\Delta t}\right)^2 + \left(\frac{\sqrt{U(SOC_i)^2 + U(SOC_f)^2}}{(SOC_i - SOC_f)}\right)^2} \tag{2}$$

The ± term (the second term) of equation (2) reflects the effect of uncertainties of SOC and current integration. The SOC is directly related to open circuit voltage (OCV)

measurement and the SOC-OCV curve slope. Hence, the OCV measurement and the SOC-OCV curve slope are determinative of capacity estimation accuracy.

The conventional operation may be summarized as follows.

Base equation (by definition of SOC):

$$Q = \frac{\text{Total Ah used}}{SOC\ \text{used}} = \frac{\sum I\Delta t}{SOC_i - SOC_f} \quad (3)$$

The implementation: calculate when ($SOC_i$–$SOC_f$)>calibration. The SOCs in the denominator are not to be calculated by current integration. Shown in the present disclosure is the SOC from Open Circuit Voltage (OCV), but other methods may be used. If the SOCs are from OCV and if temperature has been within the expected range, then SOC=f (OCV, Temperature); and then find battery cell capacity using equation (3).

An exemplary way of obtaining pack capacity is as follows: the average of all battery cells, then filtered as follows for traction battery capacity, can be calculated, for example, as average cell capacities:

$$PackCapacity = \frac{\sum CellCapacity}{\text{Number of Cells}} \quad (4)$$

Once the battery cell capacities are obtained, and the instant traction battery capacity is obtained, the fmal traction battery capacity (PackCapFinal) may be calculated through the following exemplary filter, where a is a calibrated weighting filter:

$$PackCapFinal = \alpha * PackCapLast + (1 - \alpha) * PackCap \quad (5)$$

In summary, the traction battery capacity is estimated with two OCVs from battery terminal voltage measurements when the battery cells are considered to be in steady state (i.e., rested), and with the ampere-hour integration in-between these two OCVs. Under certain applications, this estimated traction battery capacity is further filtered to reduce the fluctuation of the estimation. It is done via a first order filter, such as shown above.

One use case that significantly limits the application of the conventional operation is that most vehicle users after completing a trip would normally plug the electrified vehicle into the grid to charge the traction battery. This action immediately removes the possibility of obtaining the second SOC (i.e., the final SOC)) such as through rested battery terminal voltage measurement and then converting from the open circuit voltage to SOC via the SOC-OCV curve. Such limitations have caused some concerns with traction battery capacity learning for electrified vehicles.

It is known that traction battery capacity estimation for electrified vehicles has some issues with conventional technology. One issue is the frequency of traction battery capacity estimation. Due to the requirement of two rested SOCs (OCVs), many electrified vehicles cannot generate such use cases. Consequently, at times, traction battery capacity estimations are not carried out for a relatively long period of time. The key culprit is the lack of rested OCVs, in particular, when there is one starting rested OCV, and the electrified vehicle is put in use and then the vehicle is plugged in after the driving event. In such scenario, the conditions for performing capacity estimations are almost met except for the last rested SOC (OCV) value not being available.

As is known, under certain load conditions (e.g., current flowing in the traction battery), the extended Kalman filter (EKF) used for parameter and SOC estimations may not converge, and at times, may diverge due to adverse conditions such as low current with current measurement error large enough to be amplified by the EKF.

3.0 Solution

BECM 50 in accordance with the present disclosure utilizes an active control aspect of traction battery charging current (that is, it is requested by the BECM) to excite (drive) traction battery 24, so the terminal voltage as measured can be used to drive the EKF (or any estimator that utilizes voltage feedback based on a battery cell model) to estimate the battery states including SOC and perhaps battery model parameters. BECM 50 then uses the estimated SOC as the final SOC in the conventional operation whereby a more frequent and more accurate measurement of the capacity of traction battery 24 is achieved.

3.1 Solution: Traction Battery under Consideration

Figure 3:
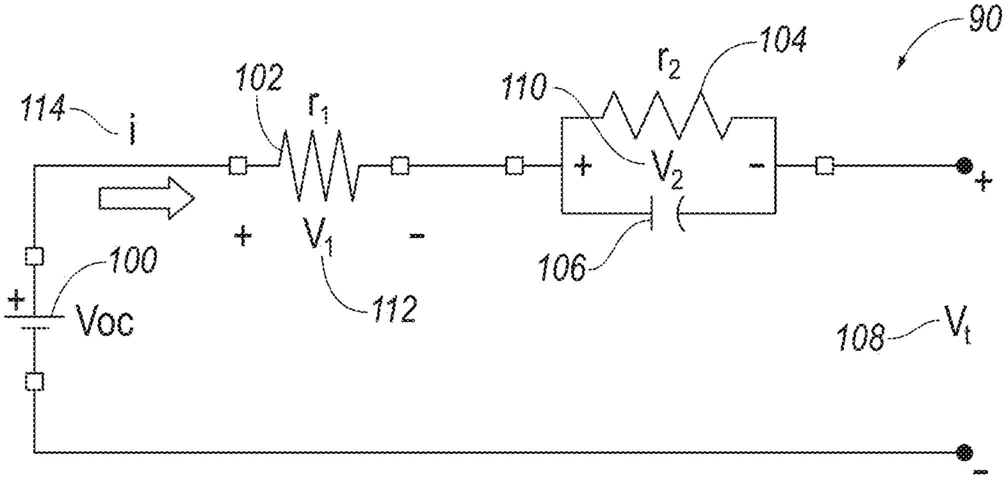
FIG. 3 illustrates a schematic diagram of an equivalent circuit model (ECM) of a battery cell of the fraction battery.

As an example, traction battery 24 comprises a plurality of identical battery cells 52 placed in series, as shown in FIG. 2. FIG. 3 illustrates a schematic diagram of an equivalent circuit model (ECM) 90 of a battery cell 52 of traction battery 24. Battery cell 52 may be modeled as a circuit and the schematic diagram of FIG. 3 shows one possible battery cell ECM.

Per ECM 90, battery cell 52 is modeled as a voltage source (Voc) 100 having associated resistances 102 and 104 and a capacitance 106. Voltage source 100 represents the open-circuit voltage (OCV) of battery cell 52. ECM 90 includes an internal resistance, $r_1$ 102, a charge transfer resistance, $r_2$ 104, and a double layer capacitance, C 106. Voltage $V_1$ 112 is the voltage drop across internal resistance 102 due to current 114 flowing through the circuit. Voltage $V_2$ 110 is the voltage drop across the parallel combination of $r_2$ and C due to current 114 flowing through the combination. Voltage $V_t$ 108 is the voltage across the terminals of the battery (terminal voltage).

Because of the battery cell impedance, the terminal voltage ($V_t$ 108) may not be the same as the OCV (Voc 100). The OCV is not readily measurable as only the terminal voltage is accessible for measurement. When no current 114 is flowing for a sufficiently long period of time, the terminal voltage is the same as the OCV. A sufficiently long period of time may be necessary to allow the internal dynamics of the battery cell to reach a steady state. When current 114 is flowing, the OCV may need to be inferred based on ECM 90. The impedance parameter values, $r_1$, $r_2$, and C may be known or unknown. For a typical Lithium-Ion battery cell, there is a relationship between SOC and the OCV such that OCV=f(SOC).

Objectives of traction battery controls are to ensure the efficient operation of the battery pack or cells. These include battery SOC and SOP estimations, among others. Many battery control parameters including SOC and SOP depend on battery capacity. Consequently, other status information such as distance-to-empty (DTE) calculations which depend on the SOC also depend on the battery capacity. As such, an accurate detection of the battery capacity is desired.

Existing control-oriented, model-based, battery state estimation methods use battery inputs (such as current) and responses (such as voltage and temperature) to estimate battery states such as SOC and battery model parameters such as equivalent resistance for the battery. In terms of battery SOC and SOP estimations, numerous battery cell models for state and parameter estimation purposes have been studied, including $1_{st}$ and $2^{nd}$ order ECMs.

Figure 4:
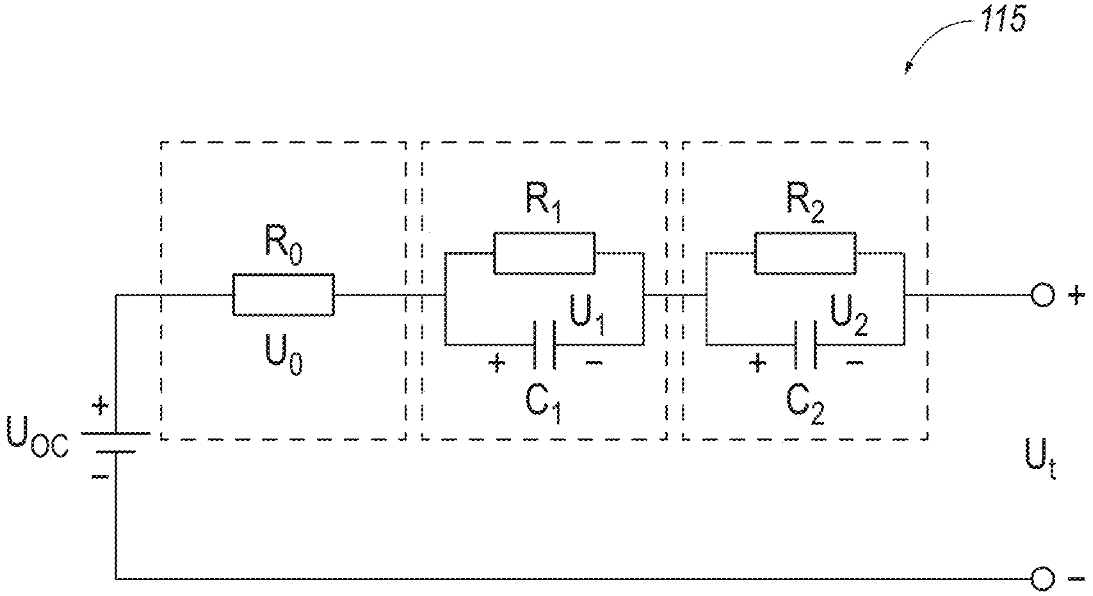
FIG. 4 illustrates a schematic diagram of a second-order ECM of a battery cell of a fraction battery.

Referring now to FIG. 4, with continual reference to FIGS. 2 and 3, a $2^{nd}$ order ECM 115 for a battery cell 52 of traction battery 24 is shown.

A discrete time state space equation for $2^{nd}$ order ECM 115 can be written as follows. The states (assuming the parameters are known):

$$\begin{bmatrix} \frac{dSOC(t)}{dt} \\ \frac{dU_1(t)}{dt} \\ \frac{dU_2(t)}{dt} \end{bmatrix} = \begin{bmatrix} \frac{-I(t)}{Q} \\ \frac{1}{C_1}I(t) - \frac{1}{R_1C_1}U_1(t) \\ \frac{1}{C_2}I(t) - \frac{1}{R_2C_2}U_2(t) \end{bmatrix} + \omega(t)$$

Here, Q is the capacity of traction battery 24 and ω(t) is the "state noise" vector.

The output (assuming the OCV depends only on the SOC of traction battery 24):

$$U_t(t) = f(SOC) - R_0 * I(t) - U_1(t) - U_2(t) + v(t)$$

Here, v(t)is the output measurement noise. A discretized version of the above equations:

$$\begin{bmatrix} SOC(k+1)Ts \\ U_1(k+1)Ts \\ U_2(k+1)Ts \end{bmatrix} = \begin{bmatrix} SOC(kTs) - Ts\frac{I(kTs)}{Q} \\ \left(1 - \frac{Ts}{R_1C_1}\right)U_1(kTs) + \frac{Ts}{C_1}I(kTs) \\ \left(1 - \frac{Ts}{R_2C_2}\right)U_2(kTs) + \frac{Ts}{C_2}I(kTs) \end{bmatrix} + \omega(kTs)$$

$$U_t(kT_s) = f(SOC(kT_s)) - R_0 * I(kT_s) - U_1(kT_s) - U_2(kT_s) + v(kT_s)$$

Figure 5:
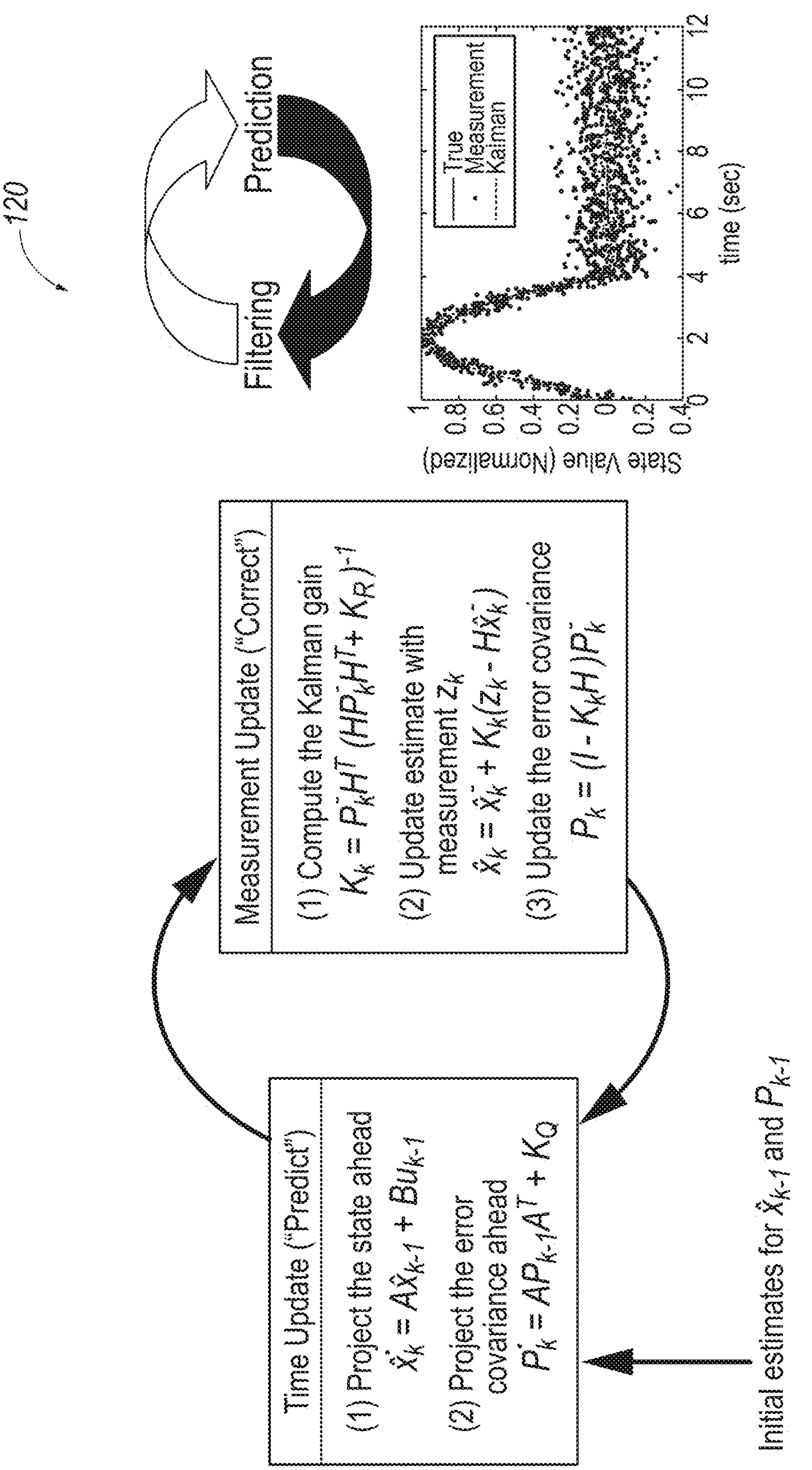
FIG. 5 illustrates a drawing depictive of configuration of an extended Kalman filter (EKF)

With or without considering the parameters as part of the state vector, an extended Kalman filter (EKF) can be used to estimate the state variables. FIG. 5 illustrates a drawing depictive of an EKF configuration 120 which can be used to estimate the state variables.

Here, the state is first predicted, and then corrected by adding the projection error with a gain K, which is obtained through a series of matrix manipulations. The matrices $K_R$ and $K_Q$ determine mostly the gain K of the EKF. As known to those of ordinary skill in the art, one of the state variables is SOC (or OCV) for the EKF. The convergence of the EKF provides an estimation of the SOC.

How to find this value through the EKF (or other online estimation) other than waiting for the battery (cell) to reach steady state (rested in terms of electrical and thermal equilibrium) is a focus of the present disclosure. Once the battery (cell) SOC is accurately estimated, the battery (cell) capacity can then be calculated per the conventional operation.

In accordance with the present disclosure, BECM 50 estimates the battery (cell) SOC by considering the specifics of charging control. The considered charging control specifics are that the charge current can be manipulated by BECM 50 through charge power/charge current request.

Figure 6:
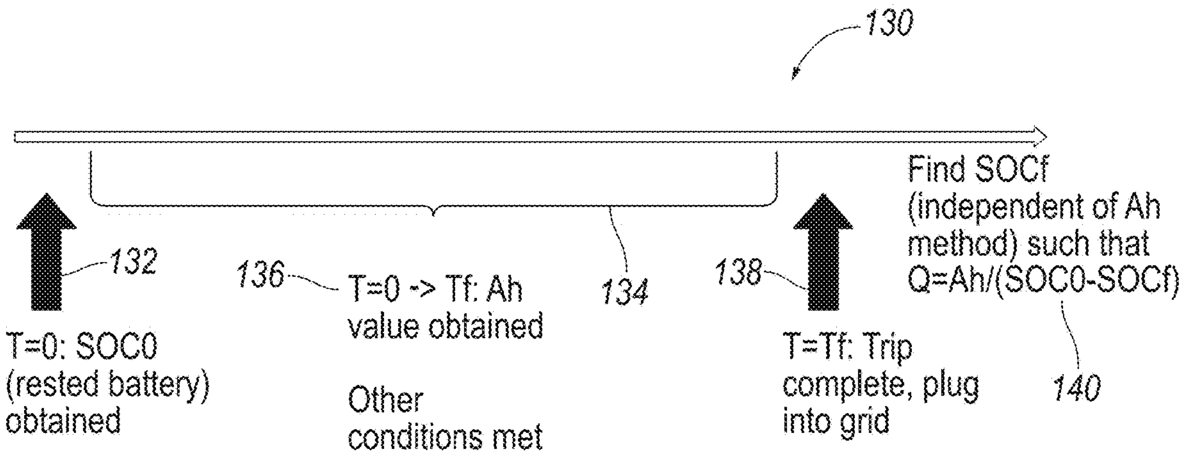
FIG. 6 illustrates a timing drawing depictive of a general outline of actions carried out by the fraction battery controller to detect the capacity of the fraction battery in accordance with the present disclosure.

Referring now to FIG. 6, a timing drawing depictive of a general outline 130 of actions carried out by BECM 50 to detect the capacity of traction battery 24 in accordance with the present disclosure is shown. These actions involve the use case where the vehicle user charges traction battery 24, then drives BEV 12 during a trip, and then after the trip plugs the BEV into the grid to recharge the traction battery. In operation, at an initial time after traction battery has been charged and is rested, BECM 50 detects the SOC of traction battery 24 at the initial time from an OCV measurement as described above, as indicated by 132. This detected SOC is the initial SOC. BEV 12 is then driven by the vehicle user for a trip, as indicated by 134. BECM 50 obtains a measurement of the current discharged from traction battery 24 during the drive time (i.e., the ampere-hour (Ah) integration value), as indicated by 136. At a final time upon completion of the trip, the vehicle user plugs BEV 12 into the grid to recharge traction battery 24, as indicated by 138. The SOC of traction battery 24 at the fmal time is the final SOC. BeCM 50 is to detect the final SOC (independent of the Ah integration) process such that $$Q = \frac{\text{Ah}}{SOCinitial - SOCfinal},$$

where Q is the capacity of the traction battery, as indicated by 140.

An issue is that traction battery 24 is not rested when the vehicle user plugs BEV 12 into the grid relatively soon after completion of the trip. Thus, BECM 50 cannot detect the final SOC of traction battery 24 from terminal voltage measurement. As described in greater detail below, BECM 50 solves this issue by alternately employing a process in accordance with the present disclosure to estimate the final SOC of traction battery 24.

3.2 Solution: Detailed Description

The following use case is explored to describe operation employed by BECM 50 for detecting the capacity of traction battery 24 in accordance with the present disclosure.

When the first SOC (rested traction battery) is obtained, and the Ah value is relatively large enough, all that is left for capacity learning is to obtain the second SOC (rested traction battery). However, a plug-in event will terminate the obtainment of the second SOC. Pursuant to the process in accordance with the present disclosure, BECM 50 solves this problem by using a portion of the charging process to learn (estimate) the second SOC (OCV). In turn, BECM 50 uses this learned second SOC along with the obtained first SOC and the Ah value to detect the capacity of the traction battery.

Further, BECM 50 can instead use the charging process to learn (estimate) the first SOC and/or both SOCs and any non-current integration process may be used.

As set forth, in the conventional operation, the battery capacity learning is normally abandoned due to the plug-in of traction battery to the charger after the trip is completed. On the other hand, BECM 50 using the proposed strategy can learn accurately the second SOC (OCV) online, in a short period of time, with minimal change to the charging process/time to achieve the goal of detecting the pack/cell capacity. This leads to enhanced battery capacity detection frequency, especially for vehicle users who charge their vehicles often.

3.2.1 Solution: Active Charge Control via Current Request

Figure 7:
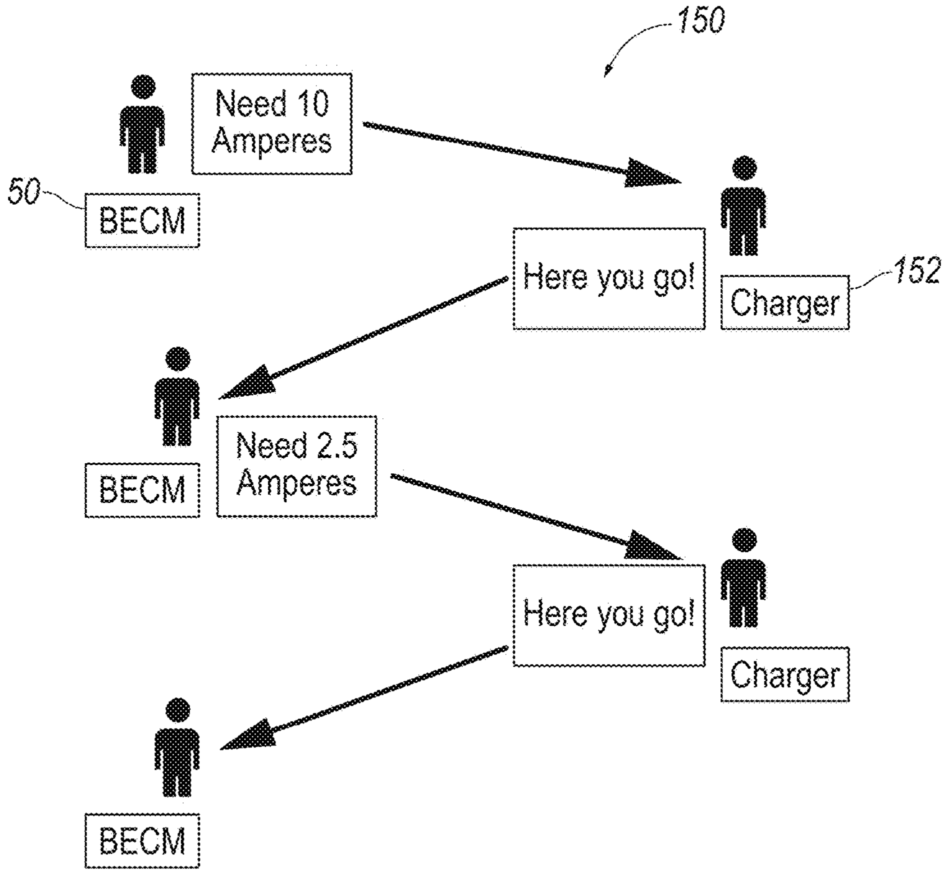
FIG. 7 illustrates a flow diagram depictive of a general outline of an active charging control carried out by the traction battery controller with a charger in accordance with the present disclosure for the fraction battery controller to detect the capacity of the fraction battery.

FIG. 7 illustrates a flow diagram depictive of a general outline 150 of an active charge control carried out by BECM 50 with a charger 152 in accordance with the present disclosure for the BECM to detect the capacity of traction battery 24. General outline 150 is an example showing how the charging control is realized. The message rate is normally in the range of 100 msec, depending on the protocols used. All charge current requests by BECM 50 should be within the capability of charger 152.

In other words, during charging, BECM 50 can modulate the charge current requested based on the (charge) power capability constraints, and the desire to have a modulated, charge current so the excitation to the system can be met. As a result, the EKF for the battery state estimation can achieve faster and more accurate estimations.

While most of the control actions (modulating of charge current) is done between BECM 50 and charger 152, the vehicle users (especially those using DC fast charge) may notice the relatively slower charging process for the first few minutes (as it normally only takes a few minutes for the BECM to carry out the control actions of the proposed strategy). As such, it may be advantageous to send out a message to the vehicle user, at the beginning of the proposed control action, such as "Internal battery control actions are in progress for the next X minutes. Charging is continuing."

3.2.2 Solution: Estimating SOC via Active Charge based Persistent Excitation

Persistent excitation to a system is needed in order to have accurate parameter estimation, even for linear time-in variant systems. The idea is that the input to the system should "excite" the different modes of the system such that each parameter's effect on the system output can be detected, and thus, its value determined.

Figure 8A:
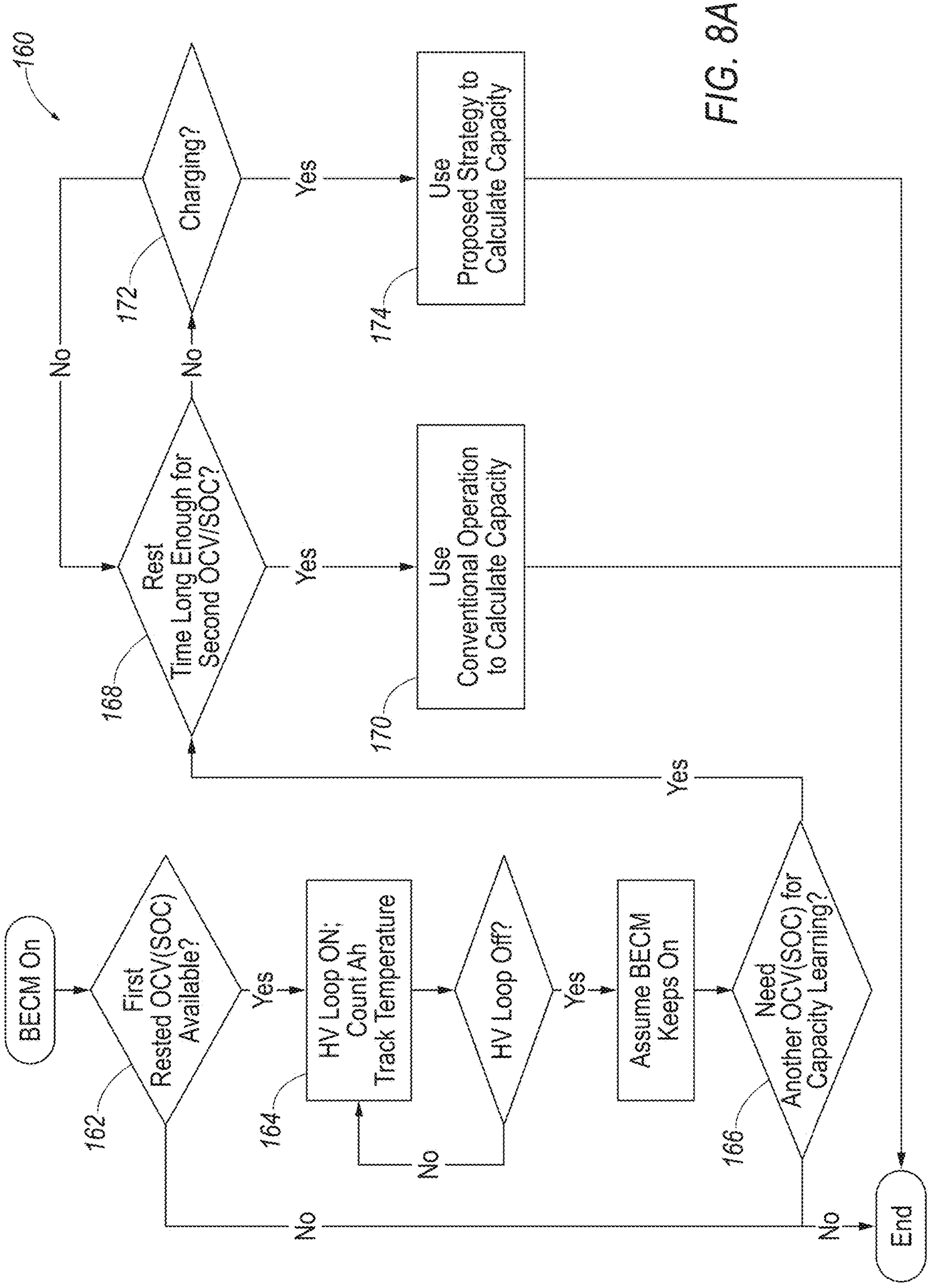
FIG. 8A illustrates a flowchart depicting a first set of operation steps of a process in accordance with the present disclosure ("the proposed strategy") for detecting the capacity of the traction battery.
Figure 8B:
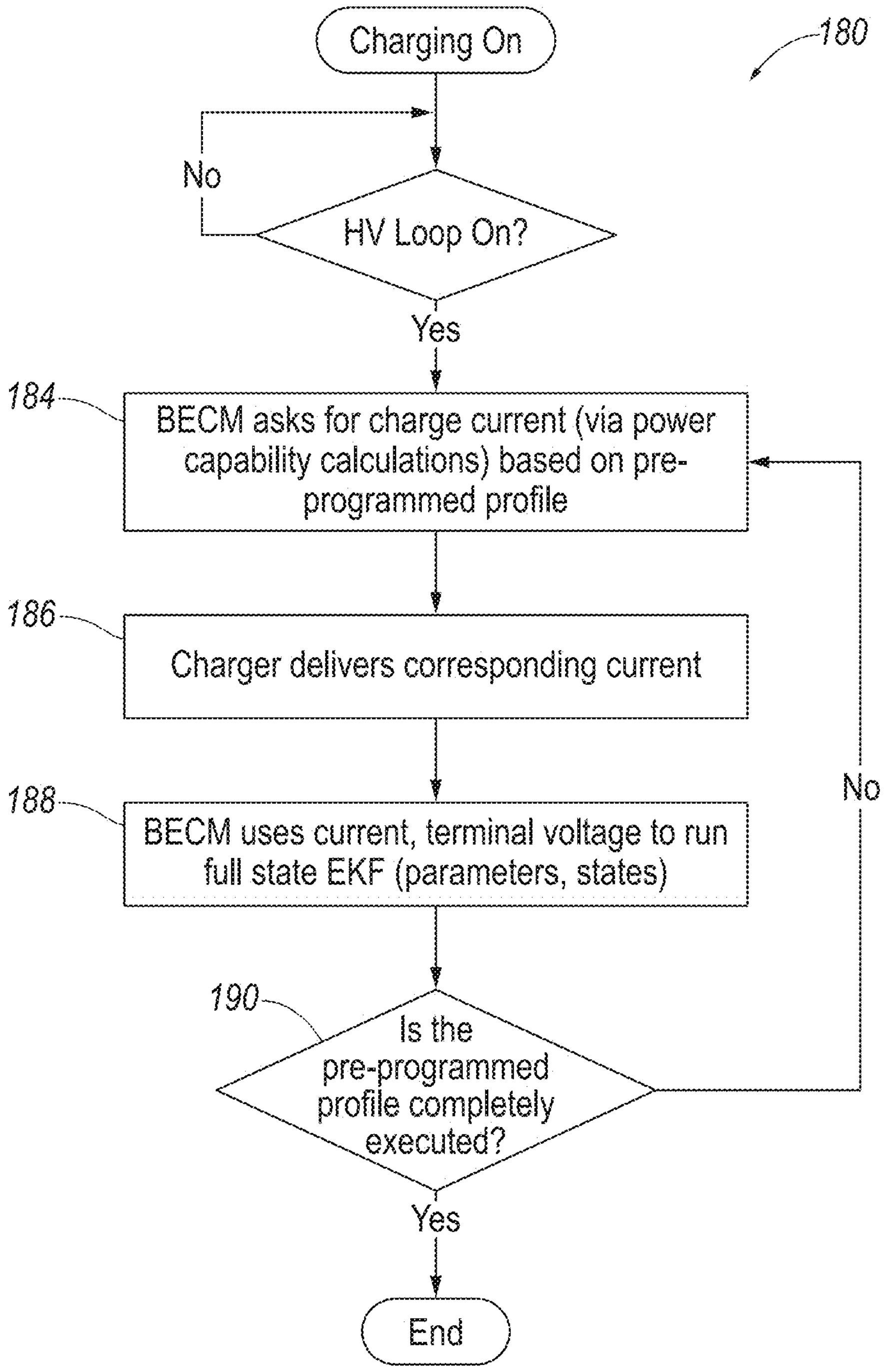
FIG. 8B illustrates a flowchart depicting a second set of operation steps of the process in accordance with the present disclosure for detecting the capacity of the traction battery.

Referring now to FIGS. 8A and 8B, first and second flowcharts 160 and 180 respectively depicting first and second sets of operation steps of a process in accordance with the present disclosure ("the proposed strategy") for detecting the capacity of traction battery 24 are shown. In accordance with the present disclosure, flowcharts 160 and 180 are flowcharts for active charge control for battery state/capacity estimation.

In the operation for detecting the capacity of traction battery 24 pursuant to the proposed strategy, prior to triggering the active charge control, BECM 50 checks to determine whether the capacity learning conditions are all available except for the second rested SOC (OCV). This includes the first rested SOC (OCV), total current throughput (Ali), battery temperature, DOD, and other calibration variables. If the requisite capacity learning variables except for the second rested SOC are all known and it is time to update the capacity of traction battery 24, then BECM 50 continues with the operation.

Note that for use cases without the first rested SOC, the proposed strategy can be used but may require different treatment (i.e., excite the system at about the end of the first charge, and then at second charge event, excite the system at the beginning of the charge). As the concept is similar to the described operation, this situation will not be described further.

The operation steps of the proposed strategy shown in flowcharts 160 and 180 of FIGS. 8A and 8B include the following. First, at key on, BECM 50 detects whether the first rested SOC (OCV) is available, as indicated by process block 162. If the first rested SOC is available (i.e., if the traction battery is rested enough), then BECM 50 detects the first rested SOC such as from an OCV measurement and continues with the operation.

It is noted that the proposed strategy can be expanded into estimating the two SOC (OCV) through active charge control. For example, there can be one SOC (OCV) estimation at the end of last charge, and one SOC (OCV) estimation at the beginning of this charge. The idea remains the same and is not described herein in further detail in the interest of simplicity.

The next step, while the HV (high voltage) loop is ON, is for BECM 50 to count the Ah value via current integration and track the battery temperature, as indicated by process block 164. BECM 50 continues with counting the Ah value and tracking the battery temperature until the HV loop is OFF. Once the HV loop is OFF, BECM 50 confirms whether all requisite conditions for capacity learning have been satisfied (e.g., the first rested SOC and the Ah value) except for the second rested SOC, as indicated by decision block 166.

Once the requisite conditions for capacity learning other the second rested SOC have been satisfied, BECM 50 checks whether a rest time of traction battery 24 following the HV loop is long enough for the second rested SOC to be available, as indicated by decision block 168. If the rest time for traction battery 24 is long enough for the second rested SOC to be available (i.e., the traction battery is rested), then BECM 50 detects the second rested SOC from another OCV measurement. Thereby, BECM 50 uses the conventional operation to calculate the capacity of traction battery 24, as indicated by process block 170.

If the rest time for traction battery 24 is not long enough for the second rested SOC to be available (i.e., the traction battery is not rested), then BECM 50 detects whether the user has plugged the vehicle into charger for 152 charging traction battery 24, as indicated by decision block 172. On the one hand, if the vehicle is not plugged into charger 152, then BECM 50 waits some time for traction battery 24 to rest, and if the second rested SOC is still unavailable, then the BECM detects again whether the user has plugged the vehicle into the charger for charging the traction battery.

On the other hand, if traction battery 24 is not rested and the vehicle is plugged into charger 152 for charging traction battery 24, then BECM 50 uses the proposed strategy to detect the second SOC (the operation steps of which are depicted in flowchart 180 of FIG. 8B). The proposed strategy encompassing detecting the second SOC using a model-based, battery state estimation method during the active charging control, as described herein. Thereby, BECM 50 uses the proposed strategy to calculate the capacity of traction battery 24, as indicated by process block 174.

As described herein, BECM 50 using the proposed strategy to detect the second SOC involves an active charging control carried out by the BECM with charger 152 while traction battery 24 is being charged by the charger. In general, through hand shaking between BECM 50 and the charger, a pre-determined, active charge profile consistent with battery charge power capability is executed. Once the active charge profile has been executed, BECM 50 determines whether a SOC estimation of traction battery 24 has converged. That is, per the active charging control, during charging, BECM 50 modulates the charge current requested based on the (charge) power capability constraints, and the desire to have a modulated, charge current so the persistent excitation conditions to the system can be met. As a result, the EKF for the battery state estimation can achieve faster and more accurate estimations. If the SOC estimation of traction battery 24 has converged after the active charge profile has been executed, then BECM 50 uses this estimated SOC as the second SOC and calculates the capacity of traction battery 24 based on this second SOC.

As a result of the active charging control being enacted, the charging of traction battery 24 will take relatively little longer than it would otherwise take.

In further detail, enactment of the active charging control involves BECM 50 requesting the charger to provide a charge current (via power capability calculation) based on a pre-programmed profile, as indicated by process block 184. In response, the charger delivers the requested current, as indicated by process block 186. BECM 50 uses the current and the terminal voltage to run a full state EKF (parameters, states), as indicated by process block 188.

Once the pre-programmed profile is completely executed, as indicated by decision block 190, BECM 50 completes the active charging control and the normal charging process is resumed.

3.2.3 Solution: Using the Estimated SOC for Capacity Estimation

As indicated, the capacity (Q) of a battery can be calculated based on the definition Q=Int(Current)/(SOC0−SOCf), where Int(Current)=Int(Current)_endofdrive+Int(Current)_charging, Int(Current)_endofdrive: Ah collected at end of drive, and Int(Current)_charging: Ah collected during charging. Note that the current is normally considered positive when it is discharged from a battery, per well-established convention. From the above equation, it can be seen that the total Ah value actually may decrease a little bit due to charging. However, since the active charging is relatively very short (in time duration and in total Ah), the effect on the overall Ah used can be very small. As long as the considered time interval is not long and charge current is controlled to be within charge current limit, then the above method can be used. Otherwise, the starting SOC has to be inferred from SOCf (estimated) and Int(Current)_endofdrive has to be used to calculate the capacity.

3.2.4 Solution: Example

Figure 9A:
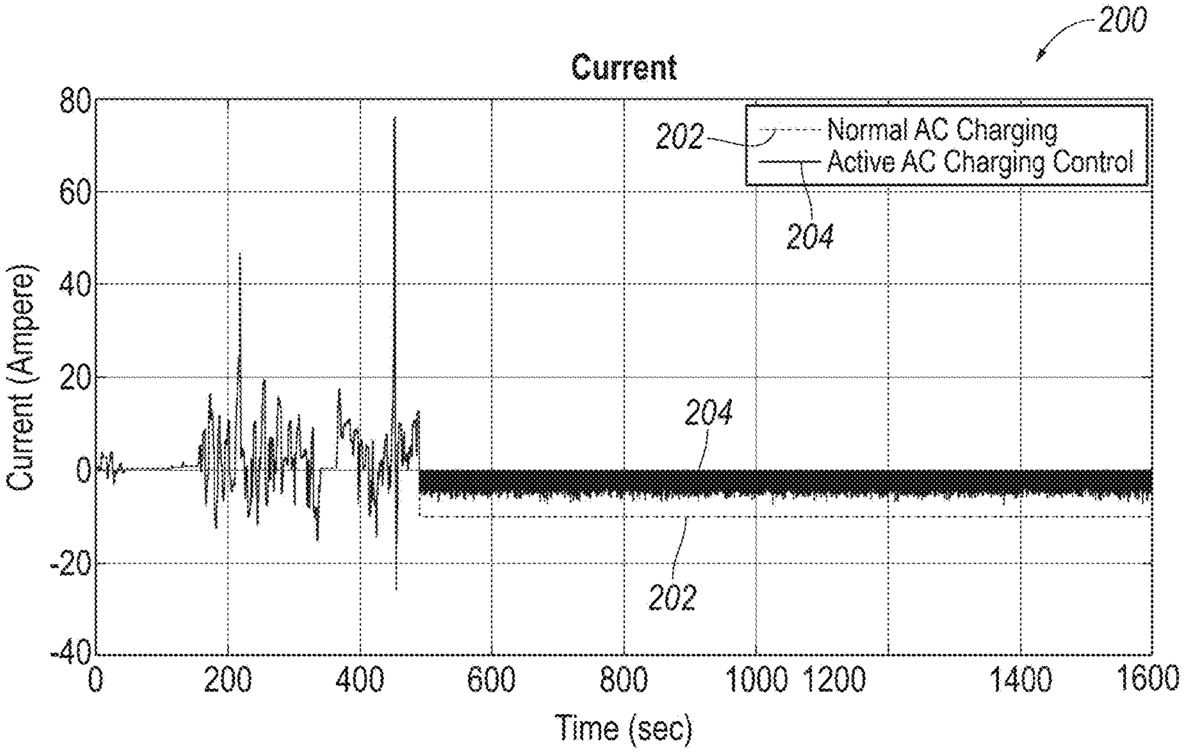
FIG. 9A illustrates a graph having a first plot of an exemplary current profile of normal charging of the traction battery by a charger over time and a second plot of an exemplary current profile of active charging of the traction battery by the charger over time, the active charging being controlled by the traction battery controller.
Figure 9B:
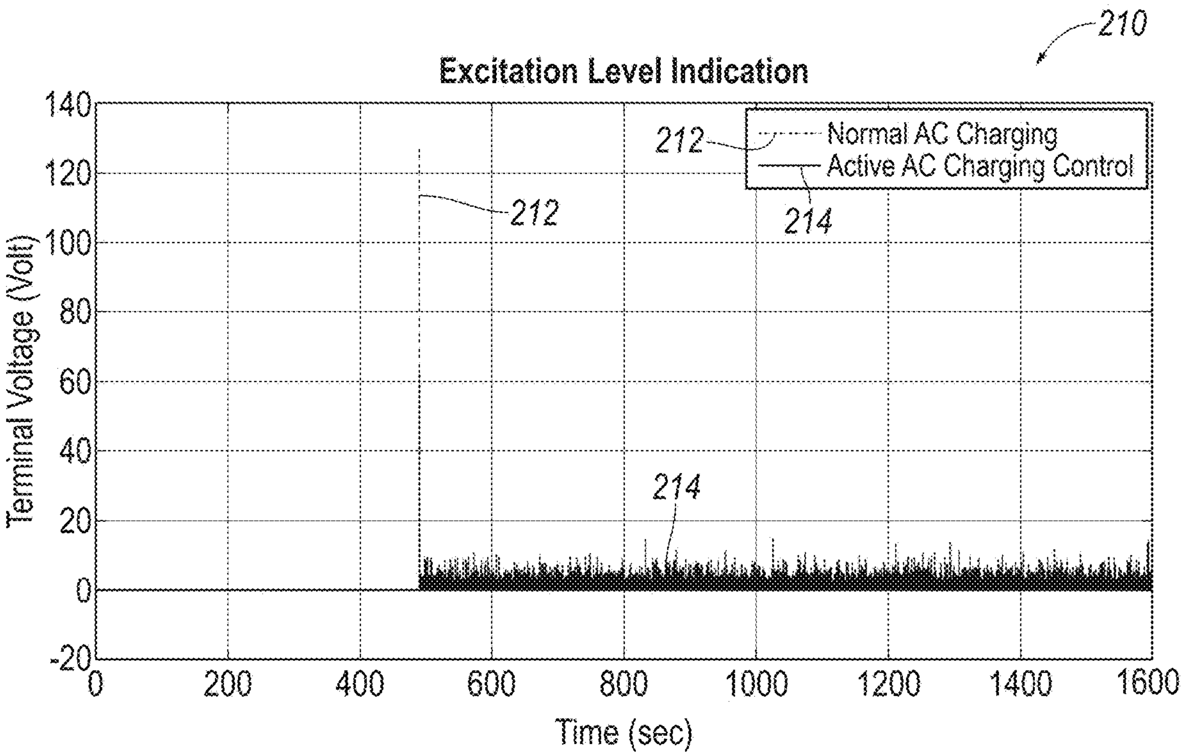
FIG. 9B illustrates a graph having a first plot of a persistent excitation level for the exemplary current profile of the normal charging over time and a second plot of a persistent excitation level for the exemplary current profile of the active charging over time.
Figure 9C:
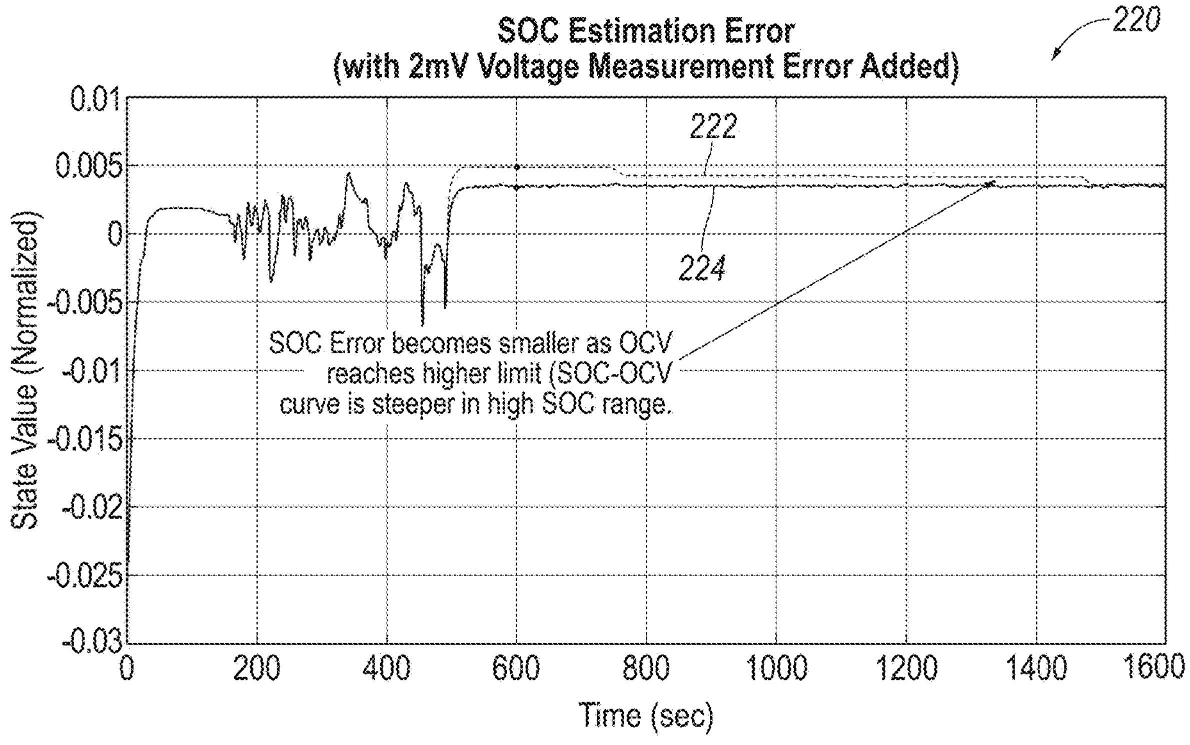
FIG. 9C illustrates a graph having a first plot of an estimated SOC of the traction battery based on the exemplary current profile of the normal charging over time and a second plot of an estimated SOC of the traction battery based on the exemplary current profile of the active charging over time.

With a simple 2RC model being used as an example, FIGS. 9A, 9B, and 9C illustrate respective graphs pertaining to the example.

Particularly, FIG. 9A illustrates a graph 200 having a first plot 202 of an exemplary current profile of normal charging of traction battery 24 by a charger over time and a second plot 204 of an exemplary current profile of active charging of the traction battery by the charger via BECM 50 over time. In the exemplary current profile shown in graph 200, active charging control takes place after 490 seconds.

FIG. 9B illustrates a graph 210 having a first plot 212 of a persistent excitation level for the exemplary current profile of the normal charging over time and a second plot 214 of a persistent excitation level for the exemplary current profile of the active charging over time. Plots 212 and 214 of graph 210 are indicative of the related "persistent execution" indicator for both current profiles for the considered charging control process. As such, graph 210 is indicative of persistent execution via active charge control.

FIG. 9C illustrates a graph 220 having a first plot 222 of an estimated SOC of traction battery 24 based on the exemplary current profile of the normal charging over time and a second plot 224 of an estimated SOC of the traction battery based on the exemplary current profile of the active charging over time. Graph 220 is indicative of the related estimated OCV values for both current profiles for the considered charging process. Notice that the controlled case has less charge for the considered process. Still, the charging is going on. In addition, the latter case can be changed to match the normal case without effecting the results.

Plots 222 and 224 of graph 220 are indicative of SOC estimations and the related estimated SOC error (compared with plant SOC) for both current profiles for the considered charging control process. An interesting phenomenon here is that SOC error actually has decreased a little bit as charging goes up. The reason is that the OCV error is actually fixed, but the SOC-OCV curve becomes steeper. This should be used to eliminate voltage measurement effect. With the learned SOC, capacity estimation can proceed as replacing the second SOC (assumed from rested battery OCV reading).

As described, a traction battery controller (i.e., BECM) in accordance with the present disclosure is configured to detect the capacity of the traction battery frequently enough to keep up with capacity changes and accurately enough to meet electrified vehicle control requirements (e.g., DTE information). As described herein, conventional operation measures the capacity of the battery using SOC (initial, final) measurements, taken once the battery is "rested" after being charged. However, there is issue with measuring the final SOC as it can take a relatively long time for the battery to become rested. The traction battery controller enhances the conventional operation by being able to estimate the final SOC without having to wait until the battery is rested. Particularly, the traction battery controller actively varies the charging current while the battery is being charged so that the terminal voltage of the battery as measured can be used to drive a Kalman filter to estimate the final SOC. The traction battery controller then employs the estimated final SOC in the conventional operation whereby a more frequent and more accurate measurement of the capacity of the battery is achieved.

As described, proposed strategies in accordance with the present disclosure have the following attributes. By actively managing charging current while maintaining certain charging level, it is possible to obtain battery OCV (SOC) estimation with relatively high accuracy, even in the presence of voltage measurement error, in a matter of few minutes. The time used to obtain such value is much shorter than simply waiting for the battery to reach rested state (equilibrium state), normally in the range of hours. The input sequence can be designed to achieve high accuracy battery model parameter estimation, at least for some parameters. The exact input profile determines the excitement of the battery model. This can be achieved in designing an input sequence that is both realizable by the charger and can be requested by the traction battery controller. The input sequence can be dynamically adjusted (i.e., it does not have to be fixed in advance). Capacity estimation frequency (by obtaining second OCV/SOC values without waiting for rested battery voltage reading) and accuracy (the model-based estimation approach can be explored) can both be optimized.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system comprising:

a first controller configured to cause a charger to actively modulate, according to a pre-determined charge current profile constructed to include a sequence of DC charge current variations defined by discrete current setpoints that are configured to provide persistent excitation of a traction battery of an electrified vehicle to enable accurate convergence of an estimator that utilizes voltage feedback based on a model of the traction battery to provide state and parameter estimations of the traction battery, a DC charge current provided by the charger to the traction battery; and a second controller configured to measure a first terminal voltage of the traction battery as the charge current is being modulated and provided by the charger to the traction battery and to drive the estimator with the first terminal voltage to estimate a first state-of-charge (SOC) of the traction battery, the second controller being further configured to detect a capacity of the traction battery based in part on the first SOC.

2. The system of claim 1 wherein:

the second controller is further configured to measure a second terminal voltage of the traction battery while the charge current is not being provided to the traction battery and the traction battery is in a steady state and to detect a second SOC of the traction battery based on the second terminal voltage.

3. The system of claim 2 wherein:

the second controller is further configured to detect a capacity of the traction battery based in part on the first SOC and the second SOC.

4. The system of claim 3 wherein:

the second controller is further configured to detect an amount of current discharged from the traction battery between a first time that the traction battery has the second SOC and a subsequent second time that the traction battery has the first SOC; and the second controller detects the capacity of the traction battery based on the first SOC, the second SOC, and the amount of current.

5. The system of claim 3 wherein:

the second controller is further configured to detect an amount of current charged to the traction battery between a first time that the traction battery has the first SOC and a subsequent second time that the traction battery has the second SOC; and the second controller detects the capacity of the traction battery based on the first SOC, the second SOC, and the amount of current.

6. The system of claim 1 wherein:

the estimator is an extended Kalman filter (EKF).

7. The system of claim 1 wherein:

the electrified vehicle is a battery electric vehicle (BEV).

* * * * *